United States Patent
Yamazaki et al.

(10) Patent No.: US 6,765,562 B2
(45) Date of Patent: *Jul. 20, 2004

(54) ELECTROOPTICAL DEVICE AND METHOD OF FABRICATING THE SAME

(75) Inventors: Shunpei Yamazaki, Tokyo (JP); Jun Koyama, Kanagawa (JP); Takeshi Fukunaga, Kanagawa (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/079,766

(22) Filed: Feb. 19, 2002

(65) Prior Publication Data

US 2002/0089483 A1 Jul. 11, 2002

Related U.S. Application Data

(63) Continuation of application No. 08/937,377, filed on Sep. 25, 1997.

(30) Foreign Application Priority Data

Sep. 27, 1996 (JP) ................................. 8-277486

(51) Int. Cl.$^7$ ........................... G09G 5/00; G02F 1/1345
(52) U.S. Cl. ........................................ 345/206; 349/151
(58) Field of Search ............................. 345/30, 36, 37, 345/45, 76, 80, 90, 92, 98–100, 103; 349/41–54, 139–152

(56) References Cited

U.S. PATENT DOCUMENTS

| | | |
|---|---|---|
| 4,356,429 A | 10/1982 | Tang |
| 4,539,507 A | 9/1985 | VanSlyke et al. |
| 4,720,432 A | 1/1988 | VanSlyke et al. |
| 4,769,292 A | 9/1988 | Tang et al. |
| 4,885,211 A | 12/1989 | Tang et al. |
| 4,950,950 A | 8/1990 | Perry et al. |
| 5,047,687 A | 9/1991 | VanSlyke |
| 5,059,861 A | 10/1991 | Littman et al. |
| 5,059,862 A | 10/1991 | VanSlyke et al. |
| 5,061,617 A | 10/1991 | Maskasky |
| 5,073,446 A | 12/1991 | Scozzafava et al. |
| 5,151,629 A | 9/1992 | VanSlyke |
| 5,294,869 A | 3/1994 | Tang et al. |
| 5,294,870 A | 3/1994 | Tang et al. |
| 5,583,347 A * | 12/1996 | Misawa et al. ................ 257/72 |
| 5,712,652 A | 1/1998 | Sato et al. |
| 5,790,213 A * | 8/1998 | Sasaki et al. .................. 349/48 |
| 5,798,746 A | 8/1998 | Koyama |
| 5,882,761 A | 3/1999 | Kawami et al. |
| 5,962,962 A | 10/1999 | Fujita et al. |
| 6,165,824 A | 12/2000 | Takano et al. |
| 6,384,818 B1 * | 5/2002 | Yamazaki et al. .......... 345/206 |

FOREIGN PATENT DOCUMENTS

| | | |
|---|---|---|
| EP | 717445 | 6/1996 |
| JP | 62-090260 | 4/1987 |
| JP | 4-350627 | 12/1992 |
| JP | 6-102530 | 4/1994 |
| JP | 08-078159 | 3/1996 |
| JP | 08-241048 | 9/1996 |
| JP | 09-148066 | 6/1997 |
| JP | 10-104663 | 4/1998 |
| JP | 10-189252 | 7/1998 |
| JP | 10-247735 | 9/1998 |

\* cited by examiner

Primary Examiner—Thu V. Nguyen
(74) Attorney, Agent, or Firm—Fish & Richardson P.C.

(57) ABSTRACT

There is disclosed an electrooptical device capable of achieving a large area display by making full use of the size of the substrate. An active matrix substrate acts as a driver portion for the reflection-type electrooptical device. A pixel matrix circuit and logic circuitry are formed on the active matrix substrate. At this time, the logic circuitry is disposed, by making use of a dead space in the pixel matrix circuit. The area occupied by the pixel matrix circuit, or image display region, can be enlarged without being limited by the area occupied by the logic circuitry.

18 Claims, 10 Drawing Sheets

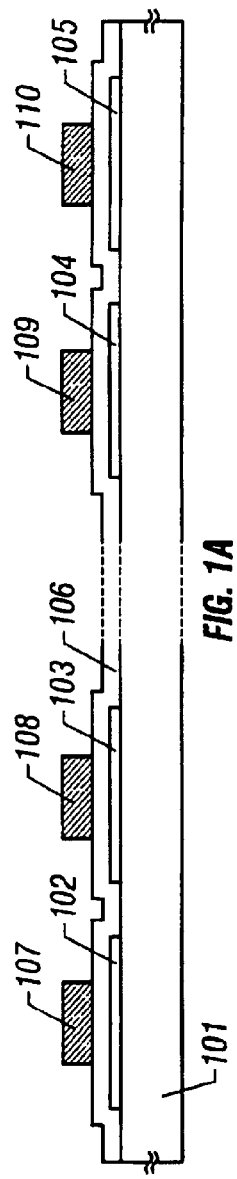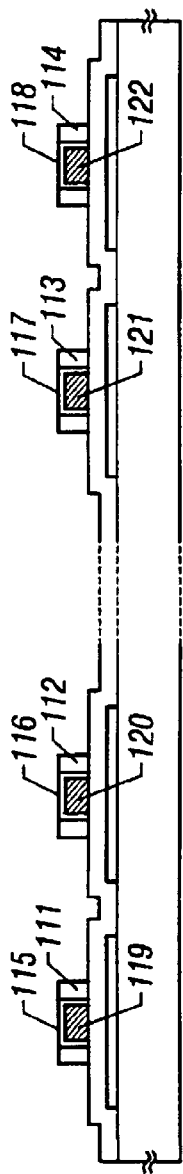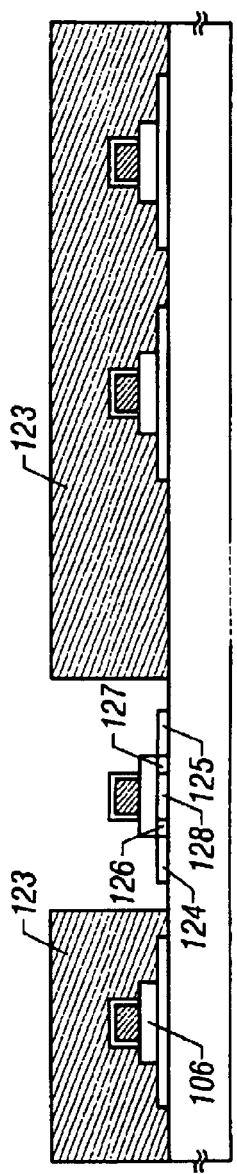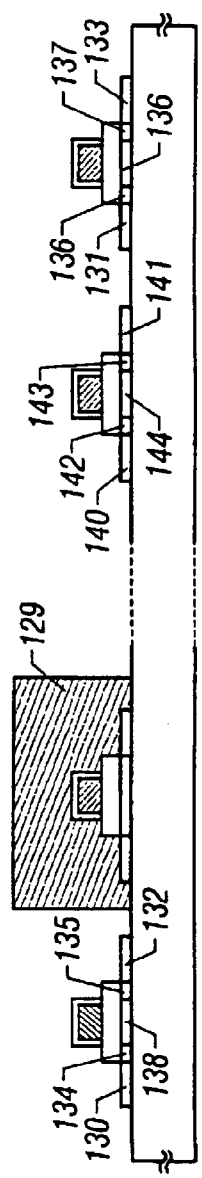

ELECTROOPTICAL DEVICE AND METHOD OF FABRICATING THE SAME

This application is a continuation of U.S. Ser. No. 08/937,377, filed Sep. 25, 1997.

BACKGROUND OF THE INVENTION

1. Field of the Invention

The present invention relates to an electrooptical device having driver circuits consisting of semiconductor devices making use of thin-film semiconductors and also to a method of fabricating such an electrooptical device. More particularly, the invention relates to an active matrix electrooptical device (AMEOD) where a pixel matrix circuit and logic circuitry are integrated on the same panel.

2. Description of the Related Art

In recent years, techniques for fabricating thin-film transistors (TFTs) on an inexpensive substrate have evolved rapidly, because there is an increasing demand for active matrix electrooptical devices. In an active matrix electrooptical device, millions of pixels are arranged in rows and columns. TFTs are arranged at each pixel. Electric charge going into and out of each pixel electrode is controlled by the switching action of each TFT.

Electrooptical devices include liquid crystal displays making use of optical characteristics of liquid crystals, electroluminescent displays employing electroluminescent materials typified by ZnS:Mn, and electrochromic displays exploiting the color changing characteristics of electrochromic materials.

These electrooptical devices are active devices that can be matrix-addressed. High-definition display can be accomplished by utilizing this active matrix construction. As mentioned above, a great feature of the active matrix construction lies in that electric charge going into and out of pixel electrodes arranged in rows and columns within an image display region of an electrooptical device is controlled by turning on and off pixel electrodes disposed at the pixels.

Another feature of the active matrix construction is that driver circuits for driving pixel TFTs are necessary to control pixels. In the prior art technique, a pixel matrix circuit formed on a glass substrate has been connected with a separately prepared driver IC to form an active matrix circuit.

In recent years, however, it has become common practice to form plural circuit TFTs forming driver circuits and a pixel matrix circuit on the same substrate to build driver circuits (known as peripheral driver circuits) around the pixel matrix circuit.

More recently, a system-on-panel (SOP) structure has attracted attention comprising a substrate on which control circuits (e.g., a processor circuit, memory circuits, A/D or D/A converter circuits, correcting circuits, and a pulse-generating circuit) are formed, as well as driver circuits (such as shift register circuits or buffer circuits) for driving pixel TFTs.

A general construction of an electrooptical device is shown in FIG. 3, which gives an example of active matrix liquid crystal display. A pixel matrix circuit 302 is formed on a glass substrate 301. This pixel matrix circuit 302 consists of integrated pixel regions. A portion of the pixel matrix circuit 302 is shown on an expanded scale at 303, where plural regions (two regions in this example) are arranged in rows and columns. At least one pair of pixel TFT/pixel electrode is disposed in each pixel region.

A horizontal scanning driver circuit 304 for transmitting data signals to data lines comprises shift register circuits, level-shifting circuits, buffer circuits, and sampling circuits. The level-shifting circuits amplify driving voltages.

It is assumed that a shift register circuit is operated with 10 V and that a buffer circuit is operated with 16 V. In this case, it is necessary to convert the voltages into other values by a level-shifting circuit. Sometimes, a shift register circuit may be constructed by combining a counter circuit with a decoder circuit. A vertical scanning driver circuit 305 for transmitting gate signals to gate lines comprises a shift register circuit, a level-shifting circuit, and a buffer circuit.

It is expected that a control circuit 306 will be located in the position shown in FIG. 3 in near future. Since the control circuit 306 is composed of complex logic circuitry or memory circuitry such as a processor occupying a large area, it is expected that the total area occupied will increase.

As described above, the pixel matrix circuit 302, the horizontal scanning driver circuit 304, the vertical scanning driver circuit 305, and the control circuit 306 are generally disposed on one glass substrate 301. Accordingly, in order to secure a maximum display area on a given size of glass, it is necessary to minimize the area occupied by circuits other than the pixel matrix circuit.

However, even if the marginal structure as shown in FIG. 3 is adopted, limitations are imposed on increases of the device density of the peripheral driver circuits. Where other values or advantages are added like a control circuit, it is more difficult to increase the area of the pixel matrix circuit.

SUMMARY OF THE INVENTION

It is an object of the present invention to provide an electrooptical device, or an optical display device, in which a pixel matrix circuit providing display regions is maximized in area by solving the foregoing problems to thereby accomplish a large area display making full use of the size of the substrate.

An electrooptical device in accordance with the present invention comprises a pixel matrix circuit and logic circuitry formed on the same substrate. The pixel matrix circuit occupies regions in which the logic circuitry is fully or partially disposed.

The present invention also provides an electrooptical device comprising an active matrix substrate having a pixel matrix circuit and logic circuitry thereon. A liquid crystal material layer is held on the active matrix substrate. The pixel matrix circuit occupies regions in which the logic circuitry is fully or partially disposed.

A gist of the present invention lies in an electrooptical device operating in the reflective mode or in the emissive mode. This device is characterized in that pixel regions located on the rear side of the pixel electrodes are effectively utilized. That is, the logic circuitry which would have heretofore been disposed in an outside frame of the pixel matrix circuit as shown in FIG. 3 is totally or partially built into the pixel matrix circuit, by making use of the pixel regions.

A cross section is taken through the active matrix construction on which the pixel matrix circuit is integrated with the logic circuitry. In this cross section, the logic circuitry is fully or partially located below the pixel electrodes connected with the pixel TFTs forming the pixel matrix circuit.

The logic circuitry means circuits other than the pixel matrix circuit consisting of driver circuits and/or control circuits. The control circuits embrace every informationprocessing circuit necessary to drive an electrooptical device, and are typified by processor circuit, memory circuit, A/D or D/A converter circuit, correcting circuit, a pulse-generating circuit.

Since an electrooptical device operated in the reflective mode (typically, a reflective-type liquid crystal display) does not need to transmit light, it is not necessary to make the pixel electrodes transparent to secure optical paths, unlike the transmissive-type liquid crystal display. Therefore, the rear side of the pixel electrodes (the lower side in the cross section described above) which has been heretofore impossible for the transmissive-type liquid crystal display to utilize can be effectively exploited to dispose the logic circuitry.

The reflective-type liquid crystal display operating in the aforementioned reflective mode is next described briefly by referring to FIGS. 4(A) and 4(B). Shown in FIG. 4(A) are an active matrix substrate 401, a counter substrate 402, and a liquid crystal material layer 403. Pixel electrodes 404 are formed on top of the active matrix substrate 401. If necessary, a reflecting plate may be formed. The pixel electrodes 404 are protected by a protective film 405.

FIG. 4(A) shows the state in which a TFT is OFF. That is, liquid crystal molecules are oriented in such a way that they do not vary the direction of polarization of incident light. Under this condition, an arbitrary direction (in this example, the direction of reflection by a beam splitter 408) of polarization is given to light 407 by a polarizer 406. The light 407 is caused to enter the liquid crystal material layer 403 via the beam splitter 408, which either transmits or reflects the light, depending on the direction of polarization.

As described above, under the condition of FIG. 4(A) (i.e., the TFT is OFF), the light 407 incident on the liquid crystal material layer 403 is reflected by the pixel electrodes 404 such that the direction of polarization is not changed. Then, the light reaches the beam splitter 408. That is, the light 407 reflected by the pixel electrodes 404 is returned with the same direction of polarization as the direction of polarization of the incident light. Therefore, the light 407 hitting the beam splitter 408 is reflected and thus does not reach the observer's eye.

On the other hand, FIG. 4(B) shows the state in which the TFT is ON. The liquid crystal molecules are oriented so as to polarize light 409 indicated by one arrow. The light 409 reflected by the beam splitter 408 undergoes a change in the direction of polarization by a liquid crystal material layer 410. Then, the light 409 is transmitted through the beam splitter 408 and reaches the observer's eye.

In this way, the electrooptical device operating in the reflective mode turns on and off light according to whether the TFT is ON or OFF. The reflection-type liquid crystal display is a typical example of such an electrooptical device. Furthermore, electrooptical devices are classified in terms of mode of operation, such as ECB (electrically controlled birefringence effect) mode, PCGH (phase change guest-host) mode, OCB mode, HAN (hybrid alignment nematic) mode, and PDLC guest-host mode (see "LCD Intelligence," August, pp. 51–63, 1996).

However, the present invention can be applied to any type of operation mode as long as a specularly reflecting plate is disposed immediately behind the liquid crystal material layer. Furthermore, the invention can be applied to active matrix electroluminescent displays operating in the emissive mode and to active matrix electrochromic displays exploiting the color changing characteristics of electrochromic materials. That is, the invention can be applied to any kind of structure excluding the transmission-type electrooptical device.

The electrooptical device referred to herein is not limited to a so-called display panel. Rather, the electrooptical device embraces commercial products incorporating display panels. We define the electrooptical device as every device that performs its intrinsic function by electrical action, optical action, or a combination thereof. For the sake of illustration, the "electrooptical device", may refer either to a display panel or to a final product employing such a display panel.

The present invention also provides a method of fabricating an electrooptical device having a pixel matrix circuit and logic circuitry formed on the same substrate. This method is characterized in that the logic circuitry is totally or partially disposed in regions occupied by the pixel matrix circuit.

The invention also provides another method of fabricating an electrooptical device. This method starts with forming an active matrix substrate having a pixel matrix circuit and logic circuitry on the same substrate. Then, a liquid crystal material layer is formed and held on the active matrix substrate. This method is characterized in that the logic circuitry is totally or partially disposed in regions occupied by the pixel matrix circuit.

An electrooptical device in accordance with the present invention is schematically shown in FIG. 5, where a pixel matrix circuit 502 is integrated with logic circuitry, 503 and 504, on a glass substrate 501. The logic circuitry includes driver circuits and control circuits. The logic circuitry, 503 and 504, overlaps the pixel matrix circuit 502.

This configuration cannot be accomplished by a transmission-type electrooptical device that needs to secure an optical path or opening for passing backlight, for the following reason. Major portions of the pixel matrix circuit of the transmission-type electrooptical device are openings and so it is impossible to build the logic circuitry into the pixel matrix circuit without decreasing the amount of light transmitted.

Accordingly, it can be said that the present invention is a technique capable of being embodied in a reflection-type electrooptical device without the need to secure an optical path. In particular, the logic circuitry is formed below (on the rear side of) the pixel electrodes acting as a reflective plate.

In FIG. 2(A), conductive interconnects, 146–150, act to interconnect circuit TFTs comprising first, second, . . . , the Nth circuit TFTs, thus constructing A/D converters, memory circuits, and so on. Thus, the logic circuitry is completed.

Data lines 152–155 are provided to permit data signals to go into and out of first and second pixel TFTs. It can be said that the data lines 153 and 155 are extraction electrodes for pixel electrodes 160 and 161. The surfaces of these pixel electrodes 160 and 161 are kept specular such that they act as reflective plates for reflecting incident light. If necessary, a reflective film serving as a mirror may be formed over the pixel electrodes 160 and 161.

The structure described thus far enables the logic circuitry, 503 and 504, to be incorporated in the pixel regions forming the pixel matrix circuit 502, as shown in FIG. 5.

Other objects and features of the invention will appear in the course of the description thereof, which follows.

BRIEF DESCRIPTION OF THE DRAWINGS

FIGS. 1(A)–1(D), 2(A)–2(C) are cross-sectional views illustrating a process sequence for fabricating TFTs in accordance with the invention;

DETAILED DESCRIPTION OF THE PREFERRED EMBODIMENTS

Embodiment 1

Figure 2A:
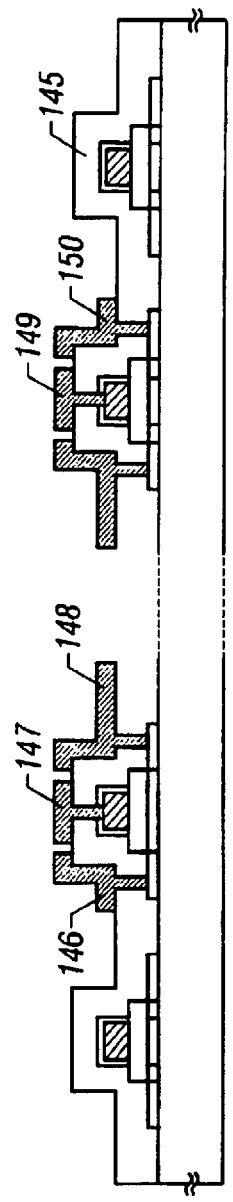
Figure 2B:
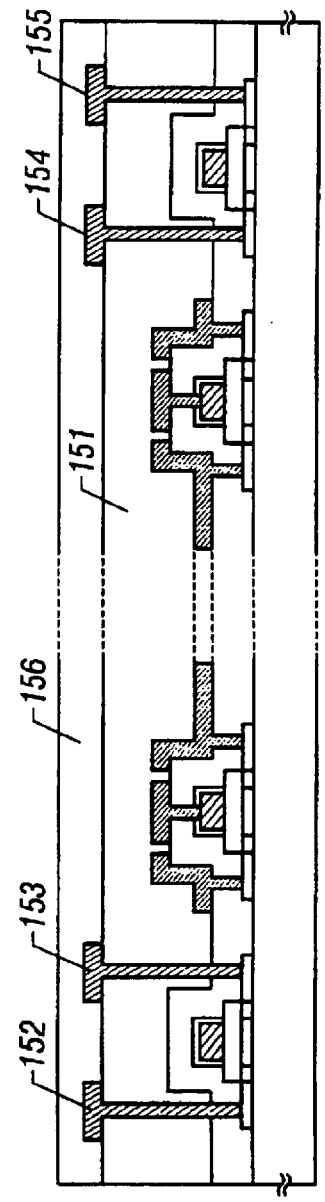

A process sequence for fabricating an active matrix substrate having a structure in accordance with the present invention is now described by referring to FIGS. 1(A)–1(D) and 2(A)–2(C). It is to be noted that the present embodiment represents one example of the present invention and that the process conditions such as numerical values given below may be appropriately determined by the manufacturer.

First, a substrate 101 having an insulating surface is prepared. In the present embodiment, a glass substrate on which a film of silicon oxide is deposited is used as the substrate 101. Instead of the glass substrate, a qiuartz substrate may be used.

Then, an amorphous silicon film (not shown) is formed to a thickness of 500 Å. The amorphous silicon film is converted into a crystalline silicon film by an appropriate crystallization technique. The crystallization is carried out by heat treatment or laser processing or both. Where the heat treatment is made, it is necessary to determine the crystallization temperature, taking account of the maximum processing temperature of the substrate of glass or quartz.

After obtaining the crystalline silicon film (not shown), it is patterned to form islands of an active layer, 102–105. The island of active layer 102 forms a first pixel TFT, while the island of active layer 105 forms a second pixel TFT.

First through Nth circuit TFTs (the intermediate circuit TFTs are not shown) are disposed between the first and second pixel TFTs which are both P-channel TFTs. The island of active layer 103 forms a first circuit TFT, whereas the island of active layer 104 forms an Nth circuit TFT. In the present embodiment, the first circuit TFT is of the N-channel type, whereas the Nth circuit TFT is of the P-channel type.

The number, or N, of circuit TFTs required varies according to the construction of the logic circuitry. In practice, millions of pixel TFTs are arranged in rows and columns on the glass substrate 101. The circuit TFTs form the logic circuitry among these pixel TFTs.

Of course, the first circuit TFT is not always identical in structure with the Nth circuit TFT. In the description of the present embodiment, it is assumed that they are fundamentally identical in structure. Obviously, the structure is varied by the logic circuitry parameters such as the channel length and the presence or absence of offset regions.

After forming the islands of the active layer, 102–105, a gate insulator film 106 is deposited to a thickness of 1200 Å. This gate insulator film 106 may be formed from silicon oxide by plasma CVD or LPCVD. Of course, thermal oxidation may also be utilized.

Then, a patterned layer, 107–110, consisting mainly of aluminum is formed on the gate insulator film 106. In the present embodiment, the patterned layer, 107–110, is made of an aluminum film having a thickness of 4000 Å and containing 0.2% by weight of scandium. The scandium is effective in preventing generation of hillocks and whiskers on the aluminum film.

The patterned layer, 107–110, provides a prototype for gate electrodes/interconnects formed later. The material of this patterned layer can also be tantalum, niobium, molybdenum, or other metallic material, as well as aluminum. Furthermore, the patterned layer can be a crystalline silicon film, or polysilicon film, to which conductivity has been imparted.

In this way, a state shown in FIG. 1(A) is obtained. A resist mask (not shown) is left on the patterned aluminum layer, 107–110. Then, anodic oxidation is carried out, using a 3% aqueous solution of tartaric acid as an electrolyte. As a result, a porous anodic oxide film, 111–114, is formed. In the present embodiment, the current is increased up to 2 to 3 mA. The voltage is increased up to 8 V. The anodic oxide film is grown to a thickness of 0.7 μm.

At this time, the anodic oxidation reaction progresses parallel to the substrate, because the resist mask (not shown) remaining on top of the patterned aluminum layer, 107–110, inhibits the reaction.

After removing the resist mask with a proprietary stripping solution, anodic oxidation is again performed to form a dense and firm anodic oxidation film, 115–118, having a thickness of 1000 Å. The used electrolyte is prepared by neutralizing an ethylene glycol solution containing a 3% tartaric acid with aqueous ammonia to adjust the pH to 6.92. The film is treated with a current that is increased up to 5 to 6 mA. The voltage is increased up to 100 V.

Since the electrolyte intrudes into the porous anodic oxidation, film, 111–114, the anodic oxidation film, 115–118, is shaped as shown in FIG. 1(B). At the same time, gate electrodes 119–122 for controlling the operation of the first, second pixel TFTs and first, Nth circuit TFTs are defined (FIG. 1(B)).

Because the anodic oxidation film, 115–118, is dense and firm, it protects the gate electrodes 119–122 from being damaged during later process steps and shields these gate electrodes against heat produced during the later process steps.

After obtaining the state shown in FIG. 1(B), the gate insulator film 106 is selectively etched off by a self-aligned dry etching process, using the gate electrodes 119–122 and the porous anodic oxide film, 111–114, as a mask. As a result, the gate insulator film 106 is left behind only under the gate electrodes and the porous anodic oxide film.

Subsequently, the porous anodic oxide film, 111–114, is removed. Those regions which will become P-channel TFTs (i.e., the regions becoming the first, second pixel TFTs, and the Nth circuit TFT) are coated with a resist mask 123.

Then, P (phosphorus) ions for imparting N type to the island of active layer 103 are implanted into this layer at a high accelerating voltage of about 80 kV by ion implantation techniques. Since the accelerating voltage is high, every P ion is implanted into the island of active layer 103 across the remaining gate insulator film 106.

Thereafter, second ion implantation is performed at a decreased accelerating voltage of approximately 10 kV.

Since the accelerating voltage is low, the P ions are not implanted under the remaining portions of the gate insulator film 106.

The second P ion implantation creates a source region 124 and a drain region 125 for the first circuit TFT. Those regions which are implanted with the P ions through the gate insulator film 106 become regions 126 and 127 more lightly doped than the source/drain regions 124, 125. Especially, the lightly doped region 127 formed closer to the drain region 125 is known as a lightly doped drain (LDD) region and effectively suppresses off currents and leakage currents.

An intrinsic or substantially intrinsic channel formation region 128 not implanted with P ions is formed immediately under the gate electrode 120. Strictly, both ends of the channel formation region 128 located immediately under the anodic oxide film 116 act as offset regions to which no gate voltage is applied.

In this way, a state shown in FIG. 1(C) is obtained. The resist mask 123 is removed, and then regions becoming N-channel TFTs are coated with a resist mask 129. Boron (B) ions are implanted into the islands of an active layer, 102, 104, and 105, to impart P type.

In the same way as in the case of the N-channel TFTs, the first ion implantation is effected at a higher accelerating voltage, and the second ion implantation is done at a lower accelerating voltage. As a result of this implantation of the B ions, source regions 130, 131, drain regions 132, 133, lightly doped regions 134–137, and channel formation regions 138, 139 for the first and second pixel TFTs are formed. Also, a source region 140, a drain region 141, lightly doped regions 142, 143, and a channel formation region 144 for the Nth circuit TFT are formed.

As a result of these process steps, N- and P-channel TFTs are separately formed at an arrangement shown in FIG. 1(D). Since the present embodiment merely represents one example of the present invention, the N- and P-channel TFTs may be manufactured by methods different from the foregoing.

Then, the dopants implanted in the active layer are activated by a heat treatment, laser processing, or both. Simultaneously with the activation, the crystallinity of the active layer sustained damage due to the ion implantation is healed.

After removing the resist mask 129, a first interlayer dielectric film 145 is formed to a thickness of 5000 Å. This interlayer dielectric film 145 can be made of a silicon oxide film, a silicon nitride film, or a lamination film thereof.

Subsequently to the formation of the first interlayer dielectric film 145, contact holes are created, and conductive interconnects 146–150 for the circuit TFTs are formed. These conductive interconnects 146–150 act to interconnect the circuit TFTs. The first through Nth circuit TFTs are interconnected to build logic circuitry. Under this condition, the first through Nth circuit TFTs are completed.

In this manner, a state shown in FIG. 2(A) is derived. Then, a second interlayer dielectric film 151 is formed to a thickness of 1 μm from polyimide that is an organic resinous material which transmits light. The polyimide can be readily formed into a thick film by spinning techniques. Also, the polyimide has excellent planarity. Furthermore, the parasitic capacitance can be reduced, because its relative dielectric constant is small.

Then, data lines 152–155 connected with the first and second pixel TFTs are formed. The data lines 152, 154 connected with the source regions 130, 131 transmit data signals from driver circuits and the data lines 153, 155 connected with the drain regions 132, 133 serve as pipelines for connecting pixel electrodes (formed later) with the TFTs.

After forming the data lines 152–155, a third interlayer dielectric film 156 is formed to a thickness of 5000 Å. In the present embodiment, the third interlayer dielectric film: 156 is also made of polyimide (FIG. 2(B)).

Thereafter, a black matrix, 157 and 158, is formed, using a material that functions to absorb light. In the present embodiment, a resinous material in which black dye or pigment has been dispersed is used. Titanium nitride or the like may also be used. The resinous material may be selected from acrylic-based materials, polyimide, polyimidamide, and polyamide.

After forming the black matrix, 157 and 158, a fourth interlayer dielectric film 159 is formed from polyimide to a thickness of 3000 Å on the black matrix. The fourth interlayer dielectric film 159 may also be made of silicon oxide or a silicide such as silicon nitride.

Notice that pixel electrodes, or a reflective plate, on the fourth interlayer dielectric film 159 need to be formed on a sufficiently planarized surface that reflects light precisely. Therefore, it is important that the fourth interlayer dielectric film 159 be sufficiently flat.

Then, pixel electrodes 160 and 161 are formed on the fourth interlayer dielectric film 159. The pixel electrodes 160 and 161 may be made of a metallic material. To set up a uniform electric field over the whole surface, the material preferably consists principally of aluminum of low resistivity. Also, in order to reflect incident light effectively, the surface of the pixel electrodes 160 and 161 is preferably made specular.

Figure 2C:
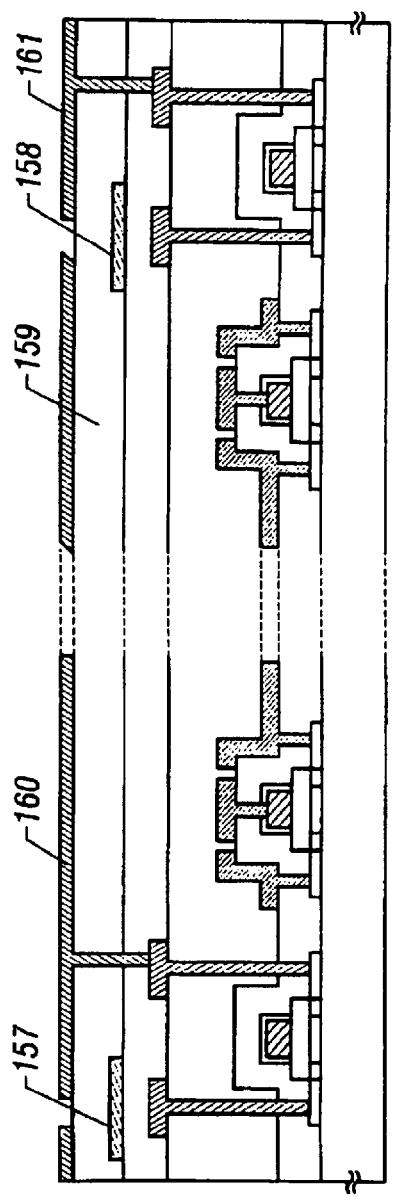
Figure 3:
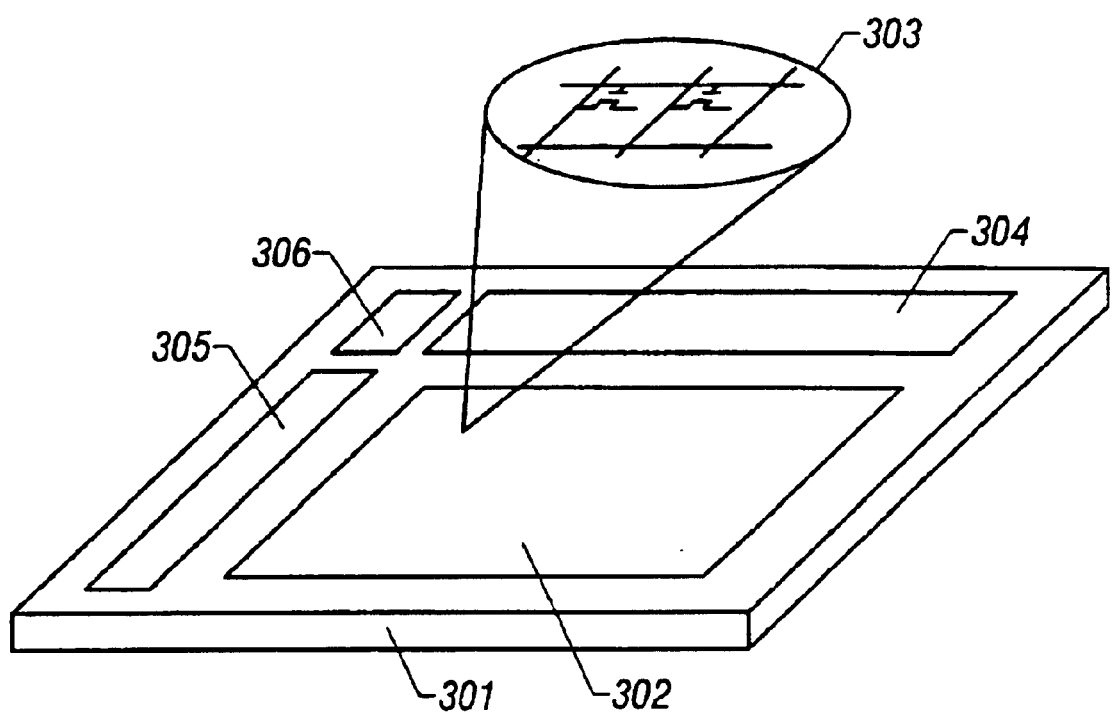
FIG. 3 is a perspective view of an electrooptical device in accordance with the invention.
Figure 4A:
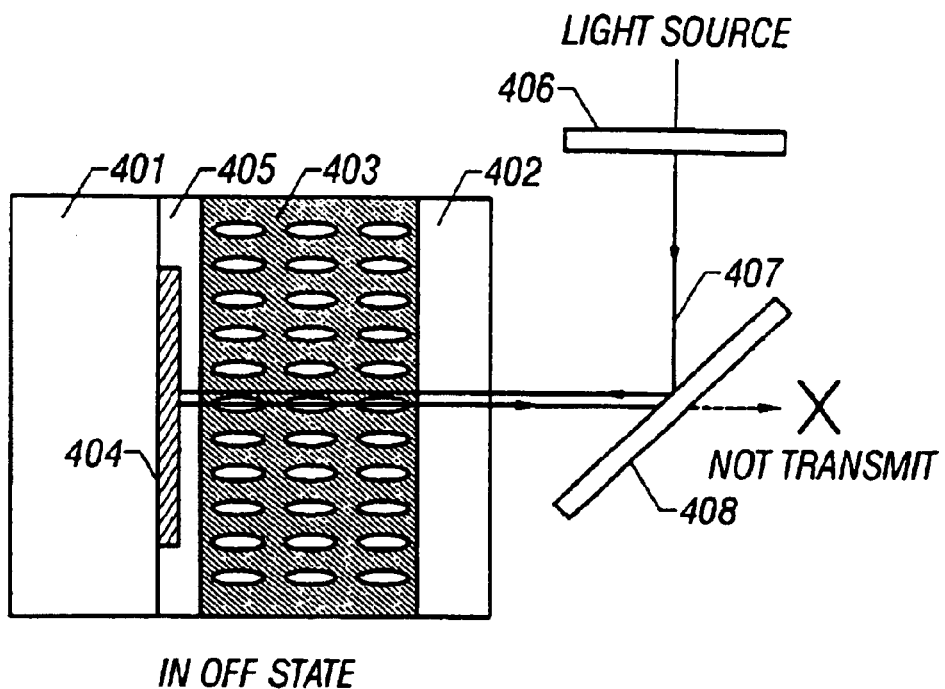
FIGS. 4(A) and 4(B) are views illustrating the operation of a reflection-type liquid crystal display.
Figure 4B:
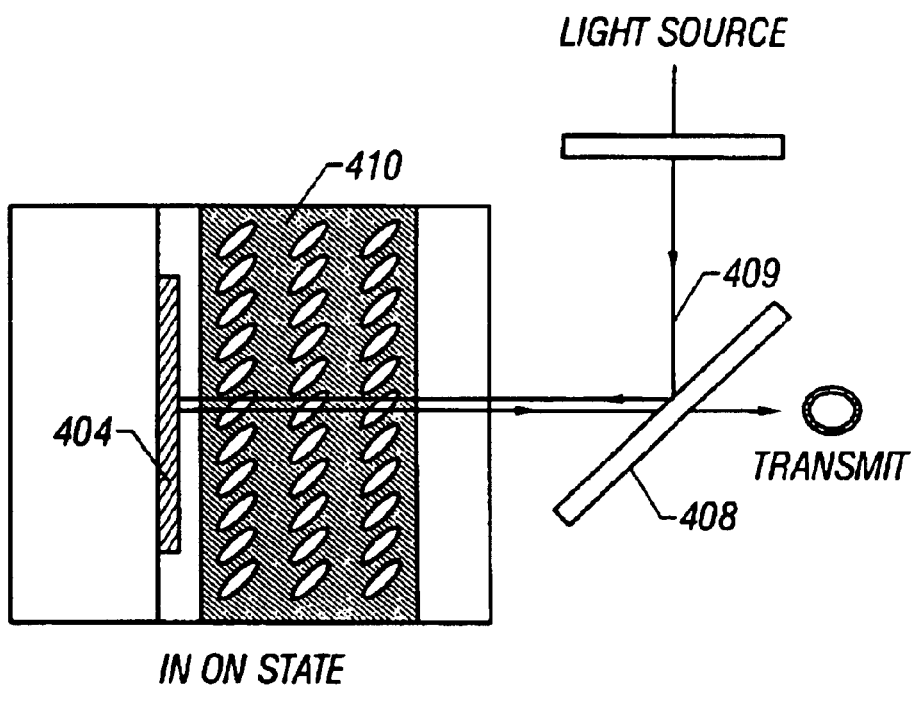

As shown in FIG. 2(C), the black matrix, 157 and 158, is patterned so as to fill the gaps between the pixel electrodes 160 and 161. As can be seen from FIG. 2(C), the first through Nth circuit TFTs are arranged below the pixel electrode 160, thus forming logic circuitry.

Normally, a protective film is formed over the pixel electrodes 160 and 161 to prevent them from deteriorating. Where the pixel electrodes 160 and 161 cannot act as a reflective plate, a separate thin metal can be formed as a reflective plate.

In this way, an active matrix substrate as shown in FIG. 2(C) can be manufactured in the manner described thus far. In the present embodiment, the transistors are planar-type transistors. The present invention can also be easily applied to other structures of TFTs such as the staggered type and inverted-staggered type.

An active matrix liquid crystal display can be built by sandwiching a liquid crystal material between the active matrix substrate manufactured in the present embodiment and a counter substrate. Where an electroluminescent material is inserted as a light-emitting layer instead of the liquid crystal material layer, an active matrix electroluminescent display can be fabricated. Where a solution containing an electrochromic colorant, dye, or electrolyte is inserted, an active matrix EC display is manufactured.

A guest-host liquid crystal display can be manufactured, for example, using a host liquid crystal material to which dichroic dye is added. The cell may be assembled by a well-known method and so the assembly operation is not described herein. Among guest-host types, the PCGH (phase change guest-host) type needs no polarizers and thus accomplishes high contrast and bright display.

Besides the guest-host type, ECB (electrically controlled birefringence) effect mode and PDLC (polymer dispersed liquid crystal) mode can be used. These types of device require neither color filters nor polarizers and therefore are quite advantageous for the reflection type liquid crystal display that tends to suffer from large light loss. In the case of the PDLC mode, a liquid crystal panel can be built, using only an active matrix substrate.

Where an electrooptical device is constructed in accordance with the present invention, the active matrix substrate and counter substrate are preferably made of glass or quartz. If a silicon wafer or the like is used to manufacture the active matrix substrate, the finished electrooptical device might deform due to a stress. In the worst case, the device might be damaged.

The greatest feature of the present invention is that circuit TFTs are formed under the pixel electrodes 160 and 161, as shown in FIG. 2(C). This construction has been impossible to achieve by the transmission-type electrooptical device that transmits light.

More specifically, regions under the pixel electrodes must be kept unfilled to form an optical path for the transmission-type electrooptical device, however, in the case of the reflection type and emissive type of electrooptical devices in the present invention, driver circuits and logic circuitry including control circuits can be packed in these regions under the pixel electrodes.

Accordingly, in the present invention, the driver circuits and control circuits which have been urged to be located in peripheral regions of a pixel matrix circuit can be incorporated in regions where the pixel matrix circuit is disposed. Hence, the pixel matrix circuit on which an image is displayed can be expanded by making full use of the size of the glass substrate.

In recent years, transmission-type electrooptical devices tend to have gradually increasing aperture ratios. This means that the unfilled area in which logic circuitry can be packed in accordance with the present invention is increased. This tendency will become more conspicuous as semiconductor devices decrease in size rapidly. Hence, it can be considered that the importance of the present invention is enhanced further.

As can be understood from the fundamental structure of the present invention, any contrivance can be made according to the need of the designer or manufacturer of the electrooptical device. That is, the inventive concept lies in that "logic circuitry is built in regions where a pixel matrix circuit is disposed." The designer may appropriately determine how the logic circuitry is arranged.

Figure 5:
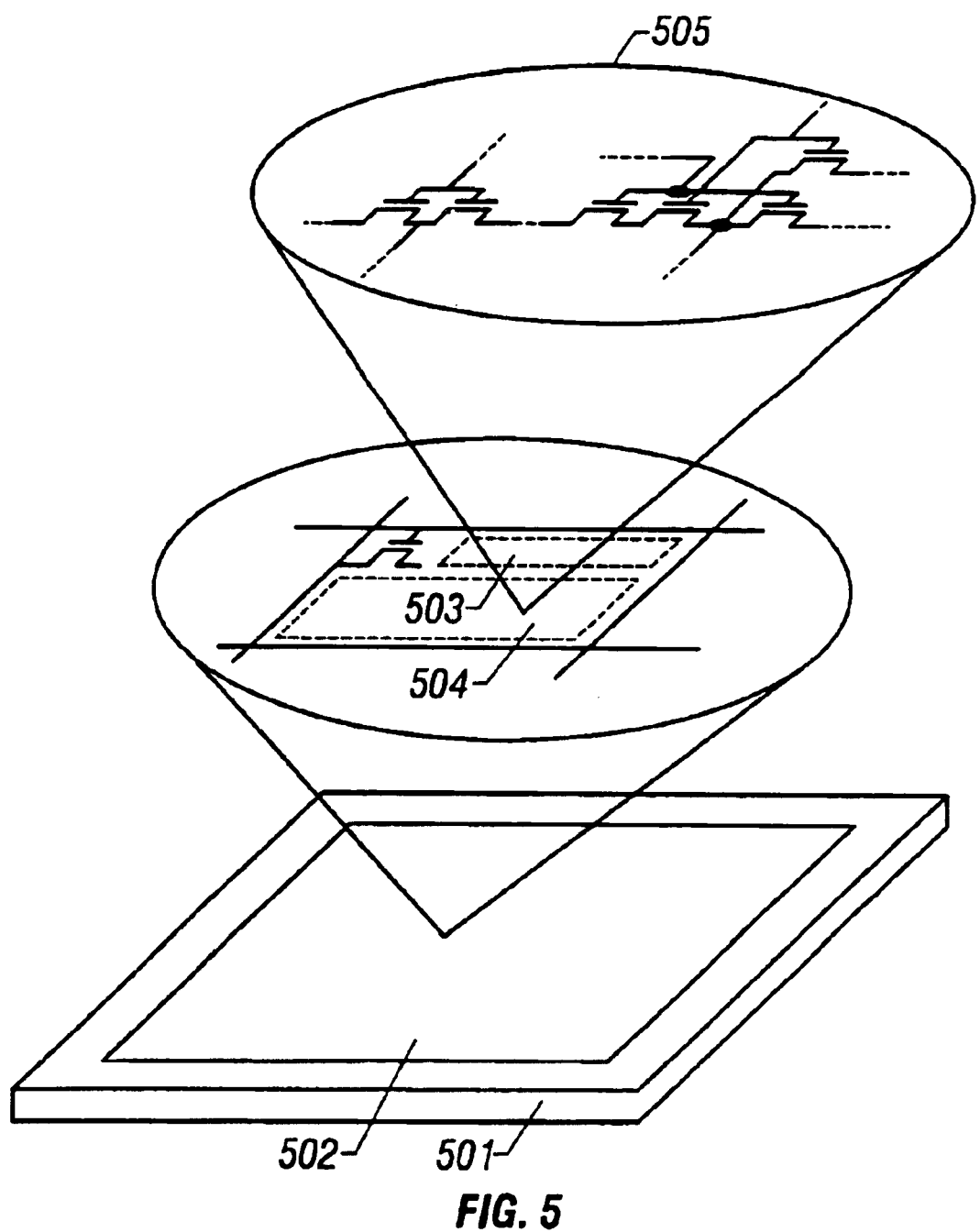
FIG. 5 is a perspective view of an electrooptical device in accordance with the invention.

The configuration of an electrooptical device fabricated in accordance with the present embodiment is next described by referring to FIG. 5 in which a glass substrate 501 and a pixel matrix circuit 502 are shown. Where a part of the pixel matrix circuit 502 is enlarged, it can be seen that logic circuits 503 and 504 are incorporated in a pixel region. It is to be noted that this construction comprising the two logic circuits 503 and 504 incorporated in one pixel region merely represent one example. One functional circuit can be fabricated over plural pixel regions by making connections with other pixel regions by means of conductive interconnects.

Where the logic circuit 504 is enlarged, it can be observed that a circuit 505 is constructed. For example, the left portion of the circuit 505 is a CMOS circuit, while the right portion is a NAND (or NOR) circuit.

The logic circuitry can be built into the pixel matrix; circuit by the structure described thus far. That is, the pixel matrix circuit 502 can be constructed by making full use of the size of the glass substrate 501, as shown in FIG. 5.

In the reflection-type electrooptical device to which the invention is applied, the pixel matrix circuit forms an image display region as it is. Therefore, large area display can be accomplished such that no limitations are imposed on the position at which the logic circuitry is located.

Embodiment 2

In the present embodiment, the usefulness of the circuit design according to the present invention is described. The invention is characterized in that a pixel matrix circuit and logic circuitry can be positioned in the same regions on a substrate of glass or quartz.

Figure 6A:
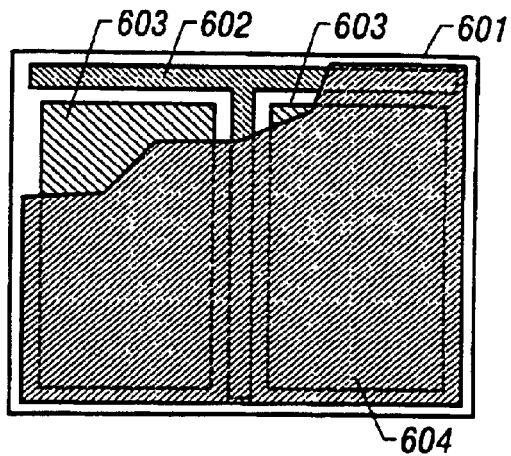
FIGS. 6(A)–6(C) are top plan views of another electrooptical device in accordance with the invention.

FIG. 6(A) shows one device in accordance with the present invention. This device has a glass substrate 601 on which a driver circuit 602 and a control circuit 603 are formed by the process sequence of Embodiment 1. Strictly, a driver circuit can be disposed in the region 602, and a control circuit can be disposed in the region 603.

The driver circuit 602, the control circuit 603, and so on constitute logic circuitry. This logic circuitry and a pixel matrix circuit 604 are arranged in the same regions. Practically, pixel TFTs forming the pixel matrix circuit 604 and circuit TFTs are formed in the same layer. Pixel electrodes connected with the pixel TFTs overlap the circuit TFTs (FIG. 2(C)).

Therefore, in FIG. 6(A), the regions of the logic circuitry which overlap the pixel matrix circuit 604 are indicated by the broken lines. Where the active matrix substrate is viewed from above as shown in FIG. 6(A), only the pixel electrodes are seen; the underlying logic circuitry is invisible.

In the case of FIG. 6(A), a vertical scanning driver circuit (the vertical portion of the T-shaped driver circuit 602) is disposed in the center of the pixel matrix circuit 604. No limitations are imposed on the method of scanning signals. Ordinary methods can be used. Besides, the gate signal-transmitting system of the left portion of the substrate may be different from the gate signal-transmitting system of the right portion. The left and right portions are located on opposite sides of the vertical scanning driver circuit, for example.

Figure 6B:
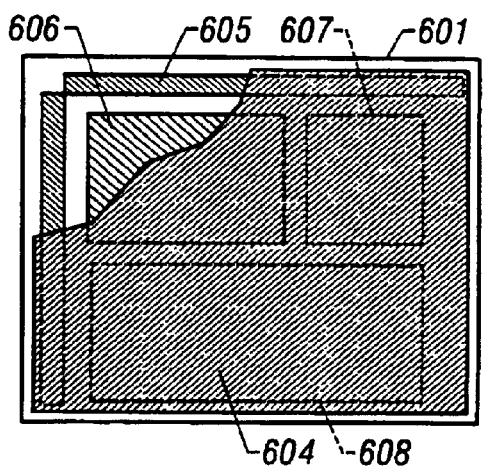

FIG. 6(B) shows a further device in accordance with the present invention. Diver circuits 605 are located at ends of a glass substrate 601. Control circuits 606–608 are arranged in a central unfilled space. It is expected that control circuits will require relatively large areas because they are complex in configuration. Therefore, the structure of FIG. 6(B) gives increased degrees of freedom in designing the control circuits 606–608, thus producing favorable results.

In FIG. 6(B), the control circuits 606, 607, and 608 are shown to be arranged in three separate regions and divided into blocks simply in terms of functions. It is not always necessary to divide these control circuits into different blocks.

In the example of FIG. 6(B), the driver circuits 605 are incorporated in the pixel matrix circuit 604. Instead, only the driver circuits 605 may be placed outside the pixel matrix circuit 604. This will increase the degrees of freedom in designing the control circuits 606–608.

Figure 6C:
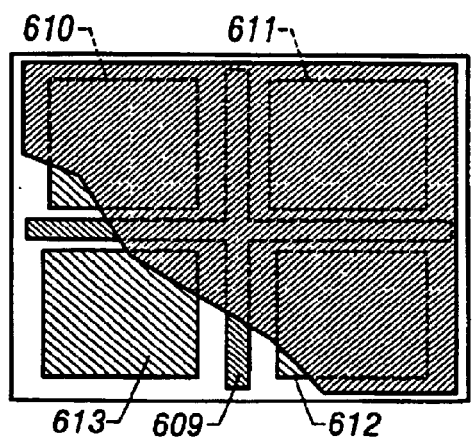

FIG. 6(C) shows a further device in accordance with the present invention. A driver circuit 609 is shaped like a crisscross. The surface of a substrate is divided into four regions. Control circuits 610–613 are arranged in these four regions, respectively.

No restrictions are imposed on the method of driving the configuration of FIG. 6(C). The four regions may be driven as a unit. Also, the four regions may be driven by separate systems. In some cases, four different frames of image may be displayed on the single substrate.

Embodiment 3

The present embodiment represents one example in which effective use of the pixel regions is made in practicing the present invention. The method of arranging the pixel electrodes is next described in detail.

Figure 7A:
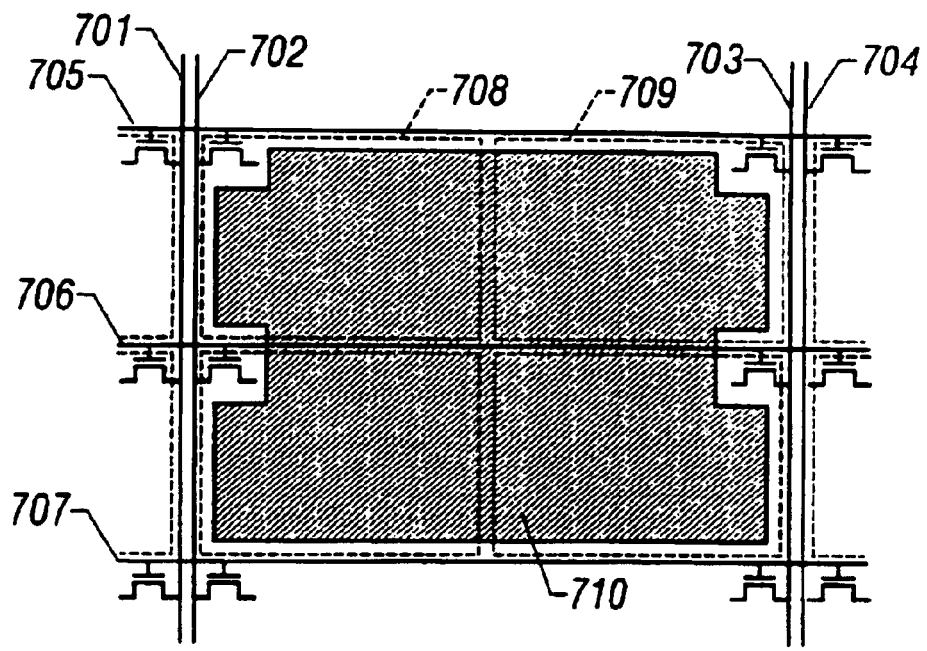
FIGS. 7(A) and 7(B) are top plan views of a further electrooptical device in accordance with the invention.

In FIG. 7(A), data lines 701–704 are arranged in parallel. Gate lines 705–707 are arranged in parallel to each other and intersect the data lines 701–704 at right angles. Pixel TFTs are connected with the intersections of the gate lines 705 and the data lines 701–704. Similarly, pixel TFTs are connected with the intersections of the gate lines 706, 707 and the data lines 701–704.

In the structure shown in FIG. 7(A), two sets of pixel TFTs and pixel electrodes (indicated by the broken lines 708 and 709) are arranged in one pixel region that is surrounded, for example, by the gate lines 705, 706 and data lines 702, 703. This structure permits the area of one pixel region to be approximately doubled compared with the prior art structure in which one set of pixel TFT and pixel electrode is arranged in one pixel region. More specifically, when logic circuitry 710 (hatched region) is incorporated in pixel regions, the logic circuitry crosses the data lines at fewer locations, thus reducing breaks in metal lines.

Figure 7B:
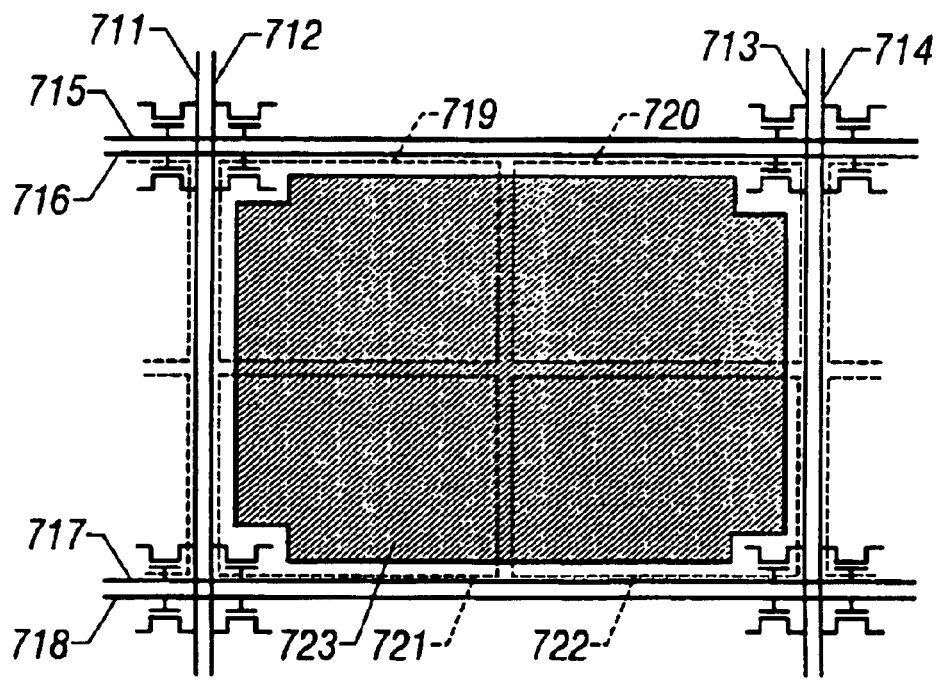

In FIG. 7(B), data lines 711–714 are arranged in parallel. Gate lines 715–718 are arranged in parallel to each other and intersect the data lines 711–714 perpendicularly. Pixel TFTs are connected with the intersections of the gate lines 715 and the data lines 711–714. Similarly, pixel TFTs are connected with the intersections of the gate lines 716–718 and the data lines 711–714.

In the structure shown in FIG. 7(B), four sets of pixel TFTs and pixel electrodes (indicated by the broken lines 719–722) are arranged in one pixel region that is surrounded, for example, by the gate lines 716, 717 and data lines 712, 713, unlike the structure of FIG. 7(A). This structure of FIG. 7(B) permits the area of one pixel region to be enlarged further. A region about four times as wide as the region of the prior art device can be secured. In this structure, logic circuitry 723 crosses the gate lines and data lines at much reduced locations. Consequently, electrooptical devices can be manufactured with still higher yield.

Embodiment 4

In the present embodiment, a structure different from the Embodiment 1 of the electrooptical device fabricated in accordance with the present invention is given. This structure is similar to the structure of Embodiment 1 shown in FIG. 2(C) except for the following points. Therefore, only these points are described, using reference numerals, by referring to FIGS. 8(A) and 8(B).

Figure 8A:
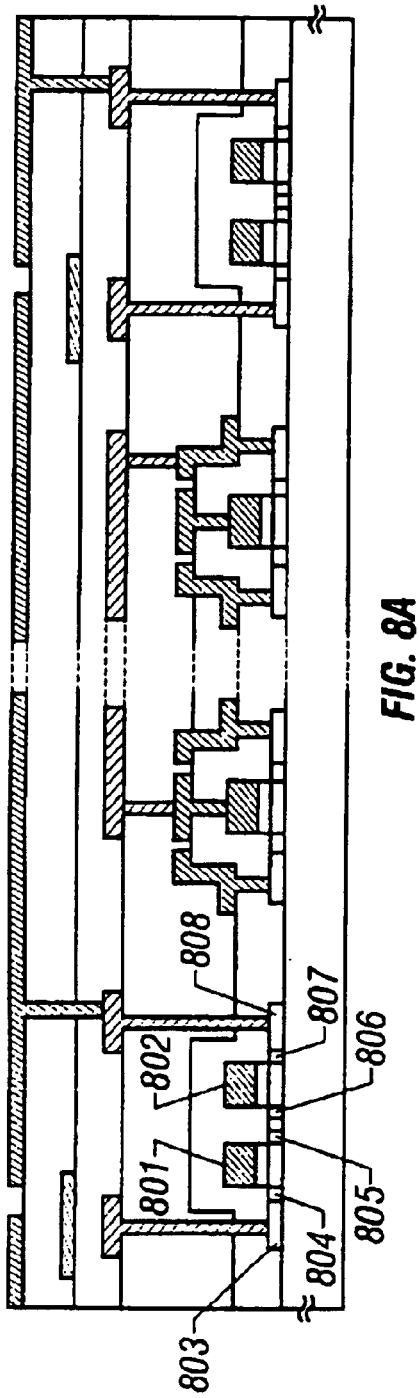
FIGS. 8(A) and 8(B) are cross-sectional views of a still other electrooptical device in accordance with the invention.

The structure shown in FIG. 8(A) comprises pixel TFTs of double gate structure. That is, two gate electrodes are formed on the active layer. Redundancy for preventing malfunctions of the pixel TFTs can be obtained.

Two gate electrodes 801 and 802 are made of a film of crystalline silicon. Using these gate electrodes 801 and 802, a source region 803, lightly doped regions 804–807, and a drain region 808 can be formed by ion implantation. Especially, the lightly doped regions 805 and 807 disposed on the side of the drain region are known as LDD (lightly doped drain) regions and are expected to suppress off currents and leakage currents effectively.

Figure 8B:
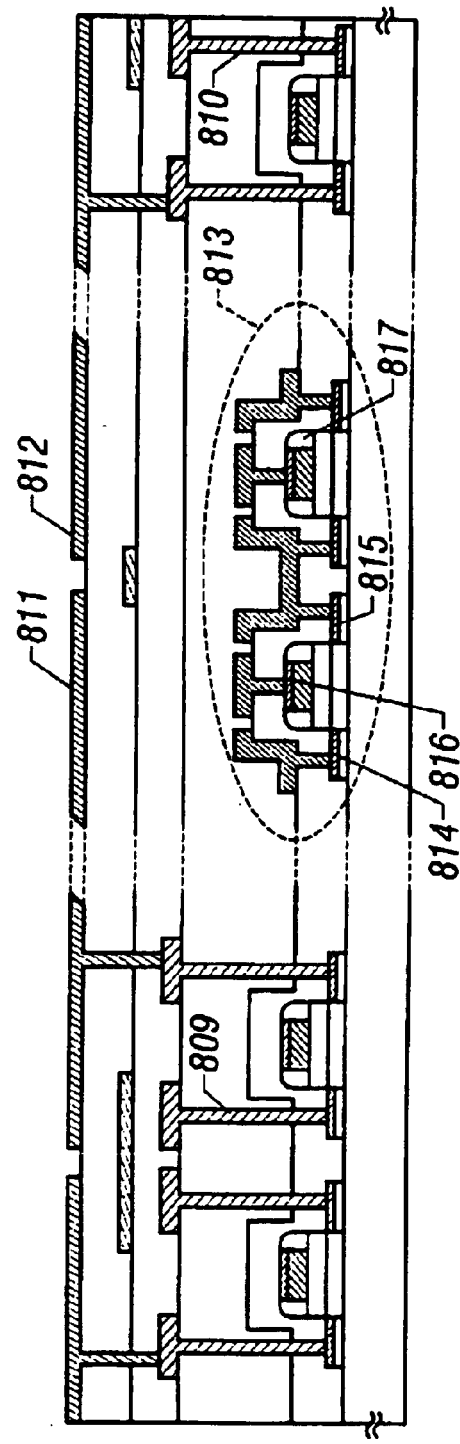

Referring next to FIG. 8(B), two sets of pixel TFTs and pixel electrodes are inserted between adjacent data lines 809 and 810. This structure is the same as the structure shown in FIG. 7(A). The data lines 809, 810 and pixel electrodes 811, 812 shown in FIG. 8(B) correspond to the data lines 702, 703 and the pixel electrodes 708, 709, respectively, shown in FIG. 7(A).

Another feature of the structure shown in FIG. 8(B) is that the pixel TFTs and circuit TFTs have a salicide structure. For instance, a CMOS circuit (inverter circuit) 813 is formed by two circuit TFTs. In this circuit 813, a tungsten silicide layer, 814–816, is formed over the source region, drain region, and gate electrode to facilitate making ohmic contacts.

The method of forming the silicide structure is well known and so is not described below. In the present embodiment, the silicide structure is formed, using a sidewall 817. Titanium, molybdenum, cobalt, and platinum can be used as a silicide material for the salicide structure, as well as tungsten.

Embodiment 5

Figure 9A:
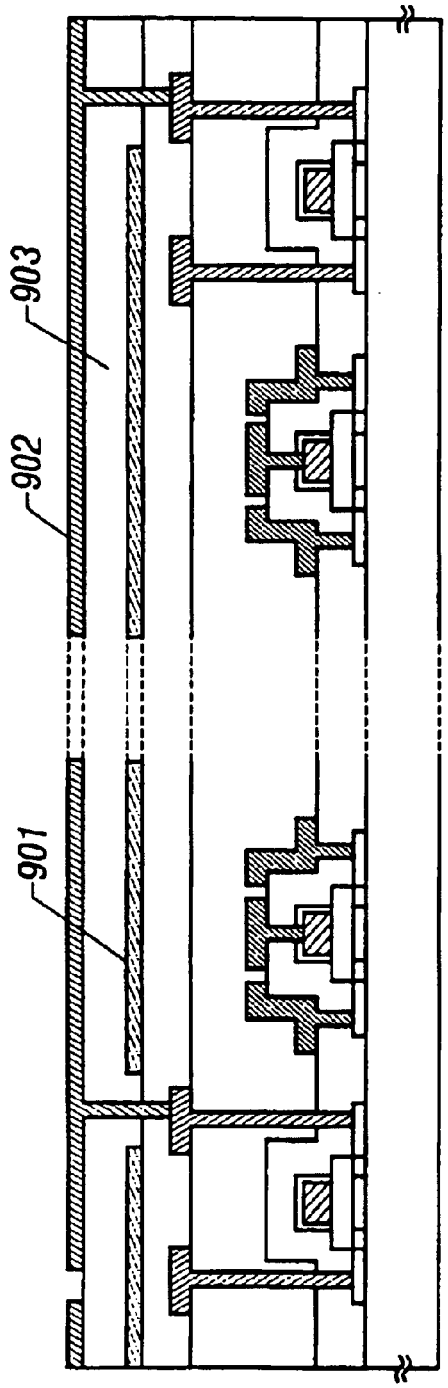
FIGS. 9(A) and 9(B) are cross-sectional views of a yet other electrooptical device in accordance with the invention.
Figure 9B:
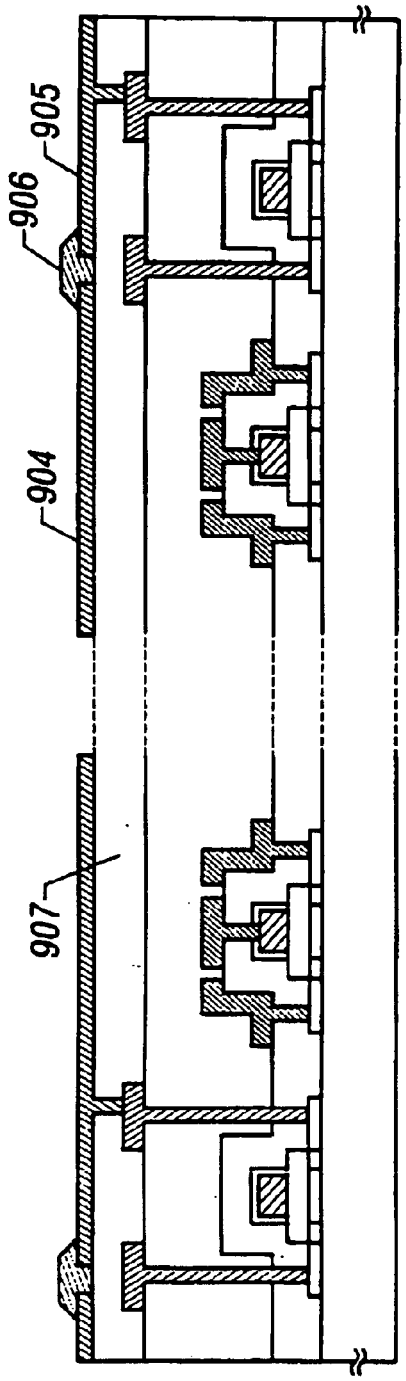

In the present embodiment, an example in which special functions are given to a black matrix structure is described by referring to FIGS. 9(A) and 9(B). The structure is roughly identical with the structure of Embodiment 1 described in conjunction with FIG. 2(C) and so only required portions will be described, using reference numerals, by referring to FIGS. 9(A) and 9(B).

In FIG. 9(A), a black matrix 901 is made of titanium nitride. Since titanium nitride exhibits quite small surface reflection, the titanium nitride functions as a black matrix and as a conductive material. The black matrix 901 is laid to overlap pixel electrodes 902. An auxiliary capacitance is formed between the black matrix and each pixel electrode. A dielectric layer 903, or a fourth interlayer dielectric film, is located between the black matrix 901 and the layer of the pixel electrodes 902. The dielectric layer 903 may be made of an organic resinous material such as polyimide, silicon oxide, or silicon nitride.

In the structure of the present embodiment, an area approximating each pixel region can be used as an auxiliary capacitance and, therefore, sufficient capacitance can be obtained. Accordingly, the material and the thickness of the fourth interlayer dielectric film 903 should be selected, placing emphasis on the planarizing effect.

In FIG. 9(B), a black matrix 906 fills the space between a pixel electrode 904 and an adjacent pixel electrode 905. The black matrix 906 is made of an organic resinous material in which a black dye has been dispersed.

The structure of FIG. 9(B) is intended to suppress a lateral electric field that might be produced parallel to the substrate between the pixel electrodes 904 and 905, thereby preventing disclination lines, or disturbance in the orientation of the liquid crystal material. For this purpose, a material having a relative dielectric constant much smaller than that of the liquid crystal material is used to cover ends (especially corners) of the pixel electrodes 904 and 905. As a result, an electric field produced by the pixel electrodes concentrates in the liquid crystal material having the higher relative dielectric constant, thus suppressing the generation of a lateral electric field between the pixel electrodes.

The liquid crystal material used in the present invention has a relative dielectric constant lying between 3.5 and 10 and shows dielectric anisotropy. When an electric field is applied to the liquid crystal material, the relative dielectric constant is about 10. In contrast, the relative dielectric constant of the organic resinous material forming the black matrix 906 is approximately 3.0 to 3.5. Thus, the requirement of the present embodiment is satisfied.

If a sufficient film thickness cannot be obtained (i.e., the ability to block light is insufficient), trenches can be formed in the third interlayer dielectric film 907 before the formation of the black matrix 906. In particular, the third interlayer dielectric film 907 is etched by self-alignment techniques, using the pixel electrodes 904 and 905 as a mask. The black matrix 906 is buried in the trenches, thus obtaining sufficient ability to block light.

The fourth interlayer dielectric film 159 shown in FIG. 2(C) can be omitted and thus the number of interlayer dielectric layers can be reduced by one. This simplifies the fabrication process, which in turn leads to an improvement in the production yield.

Embodiment 6

The present embodiment illustrates some examples of finished electrooptical apparatus incorporating an electrooptical device (or, image display device) utilizing the present invention. The image display device may be designed as the direct-view type or as the projection type, depending on the need.

Examples of the finished electrooptical apparatus include TV camera, head mounted display, car navigational system, front projection system, rear projection system, video camera, and personal computer. Some simple examples of these commercial products are next described by referring to FIGS. 10(A)–10(F).

Figure 10A:
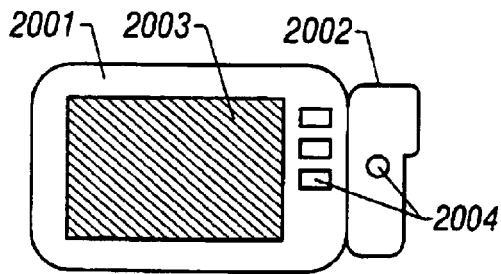
FIGS. 10(A)–10(F) are views illustrating commercial products employing electrooptical devices in accordance with the invention.

Referring to FIG. 10(A), there is shown a TV camera. The body of this camera is indicated by numeral 2001. This TV camera comprises the body 2001, a camera section 2002, a display unit 2003, and operation switches 2004. The display unit 2003 is used as a viewfinder.

Figure 10B:
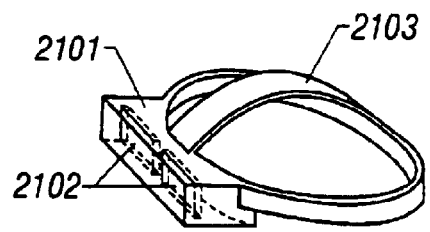

Referring next to FIG. 10(B), there is shown a head mounted display whose body is indicated by numeral 2101. This display comprises two relatively small display units 2102 and a band 2103, as well as the body 2101.

Figure 10C:
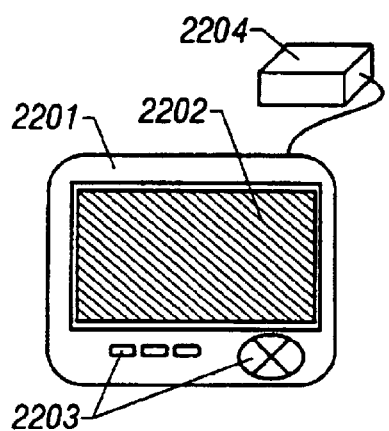

Referring next to FIG. 10(C), there is shown a car navigational system. The body of this system is indicated by numeral 2201. The body 2201 includes a display unit 2202 and operation switches 2203. The navigational system further includes an antenna 2204. The display unit 2202 is used as a monitor. The resolution can be selected from a relatively wide range of values because the main purpose is to display maps.

Figure 10D:
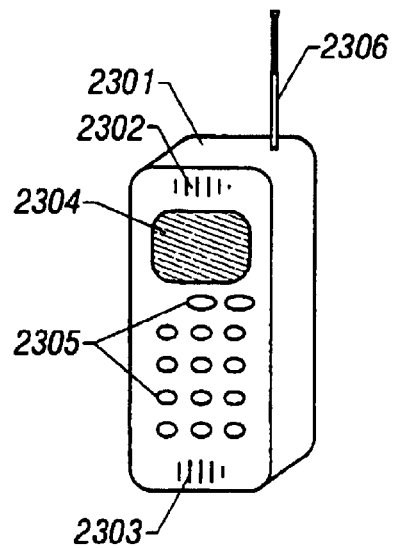

Referring next to FIG. 10(D), there is shown a personal communications device that is a digital cellular system in the present embodiment. The body of this device is indicated by 2301 and has an earpiece 2302, a mouthpiece 2303, a display unit 2304, and operation buttons 2305. An antenna 2306 is attached to the body. It is expected that the display unit 2304 will be required in the future to act as a TV phone capable of displaying moving pictures.

Figure 10E:
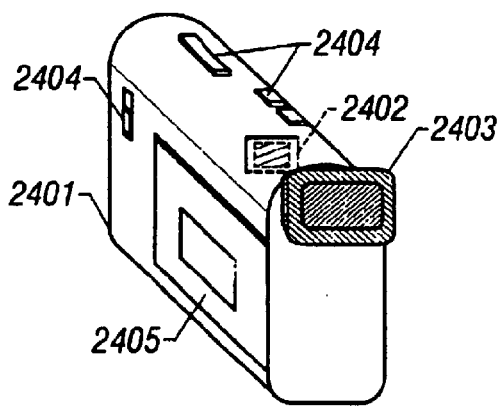

Referring next to FIG. 10(E), there is shown a video camera. The body of this camera is indicated by numeral 2401. This body includes a display unit 2402, an eyepiece 2403, operation switches 2404, and a tape holder 2405. An image taken and displayed on the display unit 2402 can be viewed on a real-time basis through the eyepiece 2403. Hence, the user can take pictures while watching the image.

Figure 10F:
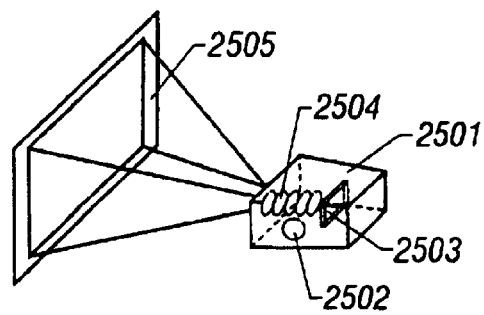

Referring to FIG. 10(F), there is shown a front projection system whose body is indicated by 2501. The body 2501 includes a light source 2502, a display unit 2503, and optics 2504 having a beam splitter and polarizers. The front projection system further has a screen 2505 that is a large-area screen used for presentations in meetings and announcements in learned or scientific societies. Therefore, the display unit 2503 is required to have a high resolution.

The present invention can be applied to various personal communications devices such as rear projection system, mobile computing system, and handy terminal. In this way, the invention can find quite extensive application and applied to various display media in every application.

It is possible to arrange a pixel matrix circuit and logic circuitry so as to overlap each other in the same regions by carrying out the present invention. That is, no limitations are imposed on the area occupied by the logic circuitry. Therefore, a wide image display region, or pixel matrix circuit, can be secured by making full use of the size of a glass substrate. Also, it follows that the region where the logic circuitry can be disposed is increased substantially. This increases the number of degrees of freedom in designing the electrooptical device. Hence, an electrooptical device of quite high performance can be accomplished.

What is claimed is:

1. A personal communication device having a display unit, said display unit comprising:

a substrate having an insulating surface;

a pixel matrix formed over the substrate, said pixel matrix comprising plural pixels and each of said pixels comprising at least one switching thin film transistor and a pixel electrode connected with the switching thin film transistor; and a control circuit having a memory circuit formed among the plural pixels, wherein at least a part of the control circuit is covered with the pixel electrode.

2. A personal communication device according to claim 1, wherein said display unit is selected from a reflection-type liquid crystal display, an active matrix electroluminescence display and an active matrix electrochromic display.

3. A personal communication device according to claim 1, wherein said personal communication device is a cellular phone.

4. A personal communication device comprising:

a body;

an earpiece;

a mouthpiece;

an antenna;

operation buttons; and a display unit, wherein said display unit comprises plural pixels over a substrate, wherein each of said pixels comprises a switching thin film transistor connected to a pixel electrode, and a control circuit having a memory circuit covered with said pixel electrode, wherein the control circuit is formed among the plural pixels.

5. A personal communication device according to claim 4, wherein said display unit is selected from a reflection-type liquid crystal display, an active matrix electroluminescence display and an active matrix electrochromic display.

6. A personal communication device according to claim 4, wherein said personal communication device is a cellular phone.

7. A personal communication device having a display unit, said display unit comprising:

a substrate having an insulating surface;

a pixel matrix formed over the substrate, said pixel matrix comprising plural pixels and each of said pixels comprising at least one switching thin film transistor and a pixel electrode connected with the switching thin film transistor; and a control circuit having a memory circuit formed over the insulating surface, wherein at least a part of the control circuit is covered with the pixel electrode.

8. A personal communication device according to claim 7, wherein the display unit is selected from a reflection-type liquid crystal display, an active matrix electroluminescence display and an active matrix electrochromic display.

9. A personal communication device according to claim 7, wherein the personal communication device is a cellular phone.

10. A personal communication device comprising:

a body;

an earpiece;

a mouthpiece;

an antenna;

operation buttons; and a display unit, wherein said display unit comprises plural pixels over a substrate, wherein each of said pixels comprises a switching thin film transistor connected to a pixel electrode, and a control circuit having a memory circuit, and wherein the control circuit is covered with the pixel electrode.

11. A personal communication device according to claim 10, wherein the display unit is selected from a reflection-type liquid crystal display, an active matrix electroluminescence display and an active matrix electrochromic display.

12. A personal communication device according to claim 10, wherein the personal communication device is a cellular phone.

13. A personal communication device having a display unit, said display unit comprising:

a substrate having an insulating surface;

a pixel matrix formed over the substrate, said pixel matrix comprising plural pixels and each of said pixels comprising at least one switching thin film transistor and a pixel electrode connected with the switching thin film transistor;

a control circuit having a memory circuit formed over the insulating surface; and a driving circuit for driving the pixel matrix circuit formed over the insulating surface, wherein at least a part of the control circuit is covered with the pixel electrode, and wherein the driving circuit is formed outside of the pixel matrix.

14. A personal communication device according to claim 13, wherein the display unit is selected from a reflection-type liquid crystal display, an active matrix electroluminescence display and an active matrix electrochromic display.

15. A personal communication device according to claim 13, wherein the personal communication device is a cellular phone.

16. A personal communication device comprising:

a body;

an earpiece;

a mouthpiece;

an antenna;

operation buttons; and a display unit, wherein said display unit comprises plural pixels and a driving circuit over a substrate, wherein each of said pixels comprises a switching thin film transistor connected to a pixel electrode, and a control circuit having a memory circuit, wherein the control circuit is covered with the pixel electrode, wherein the driving circuit is formed outside of the plural pixels.

17. A personal communication device according to claim 16, wherein the display unit is selected from a reflection-type liquid crystal display, an active matrix electroluminescence display and an active matrix electrochromic display.

18. A personal communication device according to claim 16, wherein the personal communication device is a cellular phone.

* * * * *